Feb. 11, 1947.　　　R. L. MIDGETT　　　2,415,701
SELF LOCKING GAS VALVE
Filed Oct. 22, 1945　　　2 Sheets-Sheet 1

ROLLIE L. MIDGETT
INVENTOR
BY Cecil L. Wood
ATTORNEY

Feb. 11, 1947.   R. L. MIDGETT   2,415,701
SELF LOCKING GAS VALVE
Filed Oct. 22, 1945   2 Sheets-Sheet 2
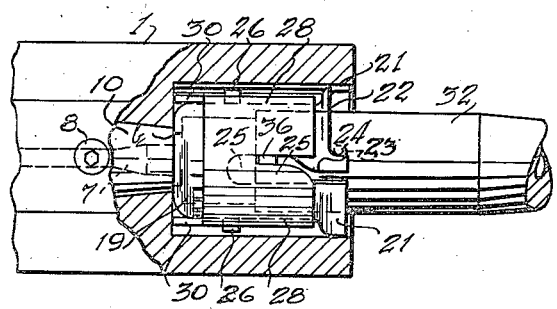
ROLLIE L. MIDGETT
INVENTOR
BY Cecil L. Wood
ATTORNEY Patented Feb. 11, 1947

2,415,701

UNITED STATES PATENT OFFICE 2,415,701

SELF-LOCKING GAS VALVE

Rollie L. Midgett, Fort Worth, Tex.

Application October 22, 1945, Serial No. 623,685

6 Claims. (Cl. 284—18)

This invention relates to valves of the type employed for gas service outlets for dwellings, commercial establishments, and the like, and it has particular reference to valves for service outlets where a hose coupling is utilized with the appliance, and its principal object resides in the provision of a safety device wherein is embodied certain elements calculated to minimize the hazard of escaping gas when the appliance is disconnected from the outlet and provide a means for shutting off the gas and locking the valve in closed position until the appliance is reconnected to the valve.

Another object of the invention resides in the provision of a valve structure which is capable of being completely enclosed in the wall without the conventional protruding jet or spigot member which is both unsightly and offers an ever present projection which often hinders the desirable arrangement of furniture about a room and presents many other undesirable features.

Broadly, the invention seeks to comprehend the provision of a service outlet valve which is incapable of being accidentally operated, as by the movement of furniture, and other objects, thereagainst, or by small children, whereby great damage may result.

While the foregoing objects are paramount, other and lesser objects will become manifest as the description proceeds, taken in connection with the appended drawings wherein:

Figure 5 is a fragmentary view of the invention in plan showing a portion cut away, illustrating the coupling installed and the association of the plug rotating and locking members and in unlocked position.

Figure 6 is a fragmentary view of the invention, showing portions cut away, illustrating the plug rotating and locking members and in locked position.

Figure 7 is a perspective illustration showing the housing in longitudinal cross-section and showing the tapered seat and passages.

Figure 8 fragmentarily illustrates, in perspection and in partial cross-section, the hose coupling.

Figure 9 illustrates, in perspective, the spring retaining washer.

Figure 10 is a perspective view, in partial cross-section, showing the tapered plug.

Figure 11 illustrates, in perspective, the plug rotating member and depicts the manner of its rigid connection with the plug shown in Figure 10, and Figure 12 is a perspective illustration of the locking member by which the plug is retained against rotation when the valve is closed.

Figure 1:
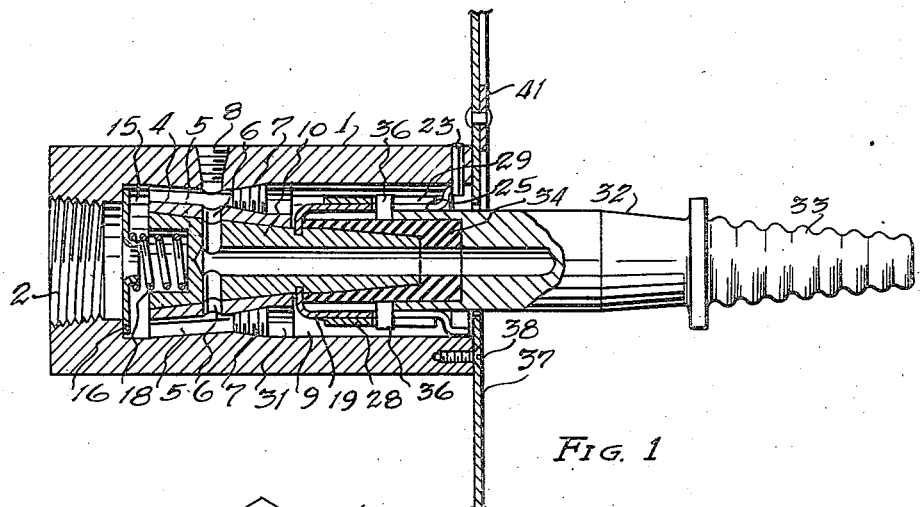
Figure 1 is a longitudinal cross-sectional illustration of the invention showing the hose coupling in partial cross-section.
Figure 2:
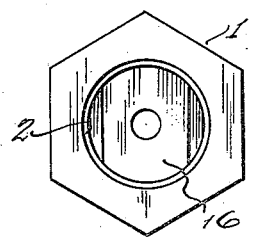
Figure 2 is a rear elevational view of the housing, showing the spring retaining washer.
Figure 3:
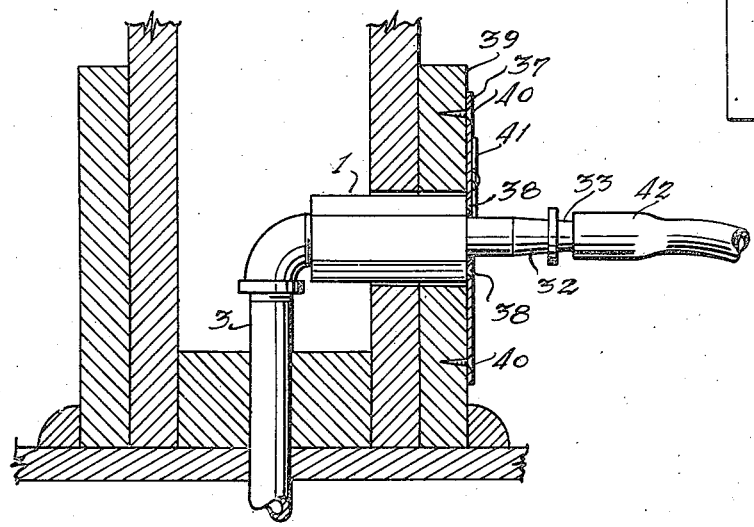
Figure 3 illustrates the invention as installed in a typical wall connection with a gas line, and fragmentarily showing the hollow wall in cross-section.

Accordingly, therefore, the invention comprises a housing 1 which may be of any desired form but which is illustrated as being hexagonal in lateral cross-section, as shown particularly in Figures 2, 3 and 7. One end of the housing 1 has internal threads 2 by which it can be threaded upon a gas outlet pipe 3, in the manner shown in Figure 3, and has a tapered seat 4 formed therein having gas passages 5 arranged on each side which communicate with the seat 4 through parts 6. The passages 5 and the parts 6 are each drilled entirely through the respective portions of the housing 1, for convenience in manufacturing the same, and closed by threaded plugs 7 and 8, respectively, exteriorly of the housing 1 and the forward ends of the passages 5, as shown in Figures 1 and 7. A relatively large cylindrical chamber 9 is formed in the housing 1 opposite to the threaded portion 2.

A tapered plug 10, shown in detail in Figure 10 and in cross-section in Figure 1, is rotatably arranged in the seat 4 and has a longitudinal bore 11 which is closed at its inner end, and lateral parts 12 capable of registration with the parts 6 of the seat 4, and provide communication between the said parts and the bore 11 when the valve is open. The larger end of the plug 10 has a recess 13 therein, the purpose of which will presently become manifest, and a circumferential groove 14 intermediate its ends. At the groove 14 the plug 10 is hexagonal in cross-section, as illustrated in Figure 10, and has several flattened sides $a$ extending away from the groove 14.

An annular groove 15 is formed in the housing 1 at the inner end of the seat 4 and between this member and the threads 2, as shown particularly in Figures 1 and 7. The groove 15 is provided to receive an oblong washer 16, shown in Figure 9, having a boss 17 thereon around which one end of a spring 18 is arranged while its opposite end extends into the recess 13 in the larger end of the plug 10, as shown in Figure 1. The spring 18 exerts a tension on the plug 10 holding it against the tapered seat 4.

A cylindrical member 19, shown in Figure 11, is provided to rigidly embrace the plug 10 at the groove 14 therein through its partially closed rounded end b in which a hexagonal aperture 20 is formed by making triangular cuts in the end of the cylinder and cramping the stock to a common facial plane.

The slits c in the rounded end b of the member 19 afford yieldability to the stock surrounding the aperture 20 permitting these members to pass over the flattened sides a of the plug 10 and into the groove 14 whose bottom surface conforms to the hexagonal form of the aperture 20 so that a semi-rigid association between the plug 10 and the member 19 results, as in Figures 1 and 5.

The opposite end 21 of the member 19 is substantially bell-shaped and approximately one-fourth of its periphery is cut away providing a recessed segment 22 which operatively receives a pin 23 in the top of the housing 1 and projecting downwardly at the forward end of the housing 1. The pin 23 functions to retain the member 19 in the housing 1 and limits its rotation therein so that the plug 10 can be rotated only about one-fourth revolution to cause the proper alignment of the parts 6 and 12 and close these parts when the plug 10 is in closed position.

Opposing slots 24 extend inwardly in each side of the member 19 from the open end 21 thereof and into one side of elongated apertures 25, the purpose of which will presently be described. Opposite the apertures 25 are integral lugs 26 which are preferably cut from the sides of the cylindrical member 19 and extend outwardly therefrom. The lugs 26 are adapted to enter opposing slots 27 in another and larger cylindrical member 28, which will be hereinafter referred to as the locking sleeve or member, and which is shown in detail in Figure 12.

The member 28 also has another pair of opposingly arranged slots 29 which are positioned between the paired slots 27, previously referred to, and each of the slots 29 has one of its sides curved outwardly near its open end in the manner shown in Figures 5, 6 and 12. In alignment with each of the slots 27 of the locking sleeve 28 is an integral projection 30 which extends longitudinally from the inner end of the member 28, as illustrated particularly in Figure 12. Each of the projections 30 has a curved surface d on one side and these members are opposingly arranged so that their respective curved surfaces d are opposite and faced so that when the member 28 is rotated to the right the surfaces d will be forward edges of the projections 30.

When assembled the cylindrical locking member 28 is placed around the member 19 so that the lugs 26 enter the slots 27 of the member 28 and the slots 24 of the member 19 and the slots 29 of the member 28 correspond, as in Figures 1, 5 and 6. The plug 10 is placed in the housing 1 through the threaded end 2 and properly seated and the spring 18' and washer 16 is placed in position. The assembled members 19 and 28 are placed in the forward end of the housing 1 into the chamber 9, the pin 23 having been removed, and the member 19 is pressed inwardly until the edges of the aperture 20 are resting in the groove 14 whereupon the pin 23 is replaced in the manner previously described and the invention is in operative condition.

The lugs or projections 30, when the valve is closed, extend into opposingly arranged indentations 31 resulting from the bores in preparing the passages 5 longitudinally of the housing 1 and in which the plugs 7 are threaded. The closed position is illustrated in Figure 6 while the open position is shown in Figures 1 and 5.

The invention is operated by a hose coupling 32, shown in Figures 1, 5, 6 and 8, which has a tapered nozzle 33 on its outer end and a cylindrical recess 34 in its inner end in which is arranged a fitting 35 of rubber or similar material, which extends beyond the inner end of the coupling 32 and has a tapered receptacle therein conformable to the smaller or outer end of the plug 10 and receives this member in the manner shown in Figure 1.

On opposite sides of the coupling 32 at its inner end are projections 36, preferably cut from the body of the coupling 32 and turned outwardly therefrom, which enter first the slots 24 of the member 19 and then the slots 29 of the member 28 which, as previously stated, are aligned in the manner shown in Figures 5 and 6. The projections 36, upon entering the slots 24, when inward pressure is applied will bear against the oppositely curved edges of the slots 29 in the member 28 causing the latter to rotate slightly and withdraw the projections 30 from the indentations 31, riding out upon the curved edges d of these members, whereupon the assembly can be rotated a quarter revolution to open the valve and thus turn on the gas. The arrangement of the slots 24 and 29 and the aperture 25, in the open position of the valve, renders it impossible to withdraw the coupling 32 until the valve is closed. Reference is had to Figure 5 to show the positions of the members 19 and 28 when the valve is open and to Figure 6 to observe the positions of these members when the valve is closed.

Figure 4:
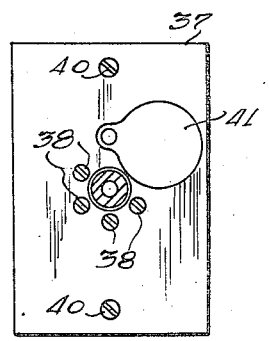
Figure 4 shows the face plate on the wall and cover for the valve outlet when the invention is not in use.

A face plate 37 is secured directly to the housing 1 by such devices as screws 38, or the like, and to the wall 39 by screws 40, as in Figures 1, 3 and 4. A pivotal cover plate 41 is adapted to close the opening into the valve assembly when the same is not in use thus presenting an attractive appearance while excluding dust, insects, and the like, from the invention. A rubber hose 42 or any suitable connection may be provided between the coupling 32 and the appliance.

Manifestly, the structure herein shown and described is capable of considerable changes and modifications by persons skilled in the art without departing from the spirit of the invention or the scope of the appended claims.

What is claimed is:

1. In a gas outlet service valve, in combination, a housing adapted to be connected to a service line and having a seat and passages therethrough, a tensioned plug on said seat having a bore therethrough and communications between said bore and said passages, a cylindrical plug rotating member secured in said housing capable of limited rotation therein and providing a receptacle for a hose coupling, a locking member arranged about the said plug rotating member and having an interlocking association therewith, a hose coupling capable of embracing the end of said plug and receivable by the receptacle in said plug rotating member and means on said coupling whereby said plug rotating and locking members are partially rotated to open and close the said valve.

2. In a service valve for gas outlets, in combination, a housing having means for connecting the same to a gas service line and passages therethrough, a tapered seat in said housing having communications therein with said passages, a tensioned plug in said seat and a bore therethrough communicating with said passages through the said seat, means comprising a cylindrical member in said housing having rigid association with said plug capable of partially rotating the same, a locking cylinder arranged about said cylindrical member having interlocking association therewith and capable of locking the said cylindrical member and said plug against rotation and a hose coupling engageable with said plug and said cylinders and capable of locking and unlocking the assembly and rotating the same.

3. In a service valve for gas lines, in combination, a housing having a valve seat and gas passages therethrough communicating with said passages, a plug rotating member in said housing capable of limited rotation and means associated therewith locking the said rotating member and said plug against rotation when said passages are closed, a hose coupling for said valve engageable with said plug and means on said coupling for rotating said plug rotating member and actuating said locking means.

4. In a gas outlet service valve, in combination with a housing having a seat and gas passages through said seat and a plug in said seat having a passage therethrough communicable with said first named passages, a plug rotating member in said housing and a locking member therefor operatively associated therewith, a hose coupling engageable with said plug and means on said coupling for rotating said plug rotating and locking members.

5. In a service outlet valve for gas lines, a housing for said valve adapted for connection to a gas line, a tapered seat in said housing and gas passages through said housing and said seat, a pair of identations arranged on each side of said seat, a tensioned tapered plug arranged in said seat having a longitudinal bore and communications between said bore and said passages and capable of rotation to close said communications, a sleeve member retained in said housing and having rigid connection with said plug and capable of limited rotation in said housing, the said sleeve having a pair of opposingly arranged slots therein, each having enlarged portions toward their inner ends, and integral lugs opposite said slots, a cylindrical locking member slidably arranged upon said sleeve having opposing projections extending from its inner end engageable with said indentations and longitudinal slots corresponding to the said slots in said sleeve and a hose coupling adapted to detachable embrace the tapered end of said plug and having projections thereon engageable with the slots in both sleeve and locking member capable of rotating the latter to open and close the said valve and lock the same when said coupling is rotated.

6. In a valve for service outlets for gas lines, in combination with a housing having gas passages therethrough, a seat in said housing and a tensioned tapered plug in said seat having communications therethrough with said passages, a recess on each side of said seat opening toward the outlet of said valve, a plug rotating member rigidly connected to said plug and capable of only limited rotation in said housing, slots opposingly arranged in said plug rotating member and projections thereon opposite to said slots, a locking sleeve embracing said rotating member and having projections on its inner end engageable with said recesses when said valve is closed, a pair of slots arranged in the said sleeve corresponding to the slots in said rotating sleeve and a pair of slots therein engageable by said projections on said rotating member and a detachable hose coupling having means thereon for rotating both locking and plug rotating members to open and close said valve and lock and unlock the same.

ROLLIE L. MIDGETT.